United States Patent Office 2,761,821
Patented Sept. 4, 1956

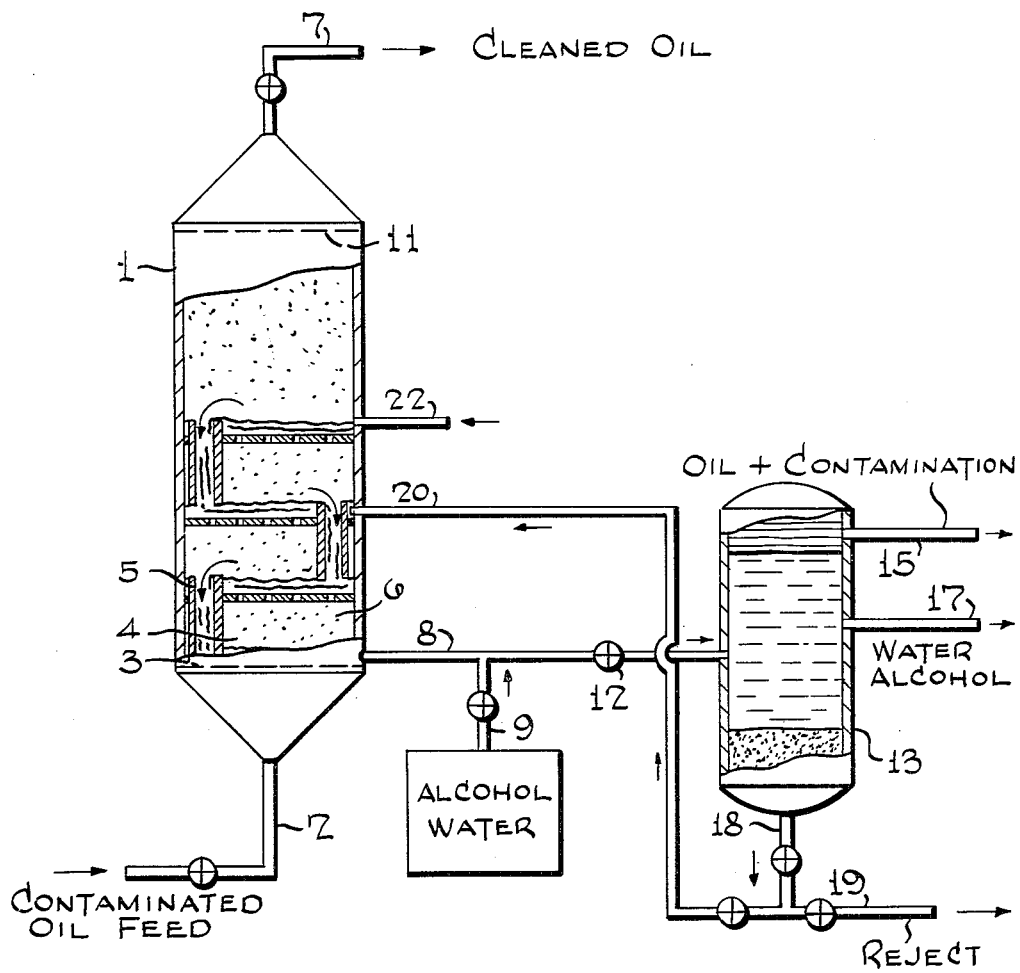

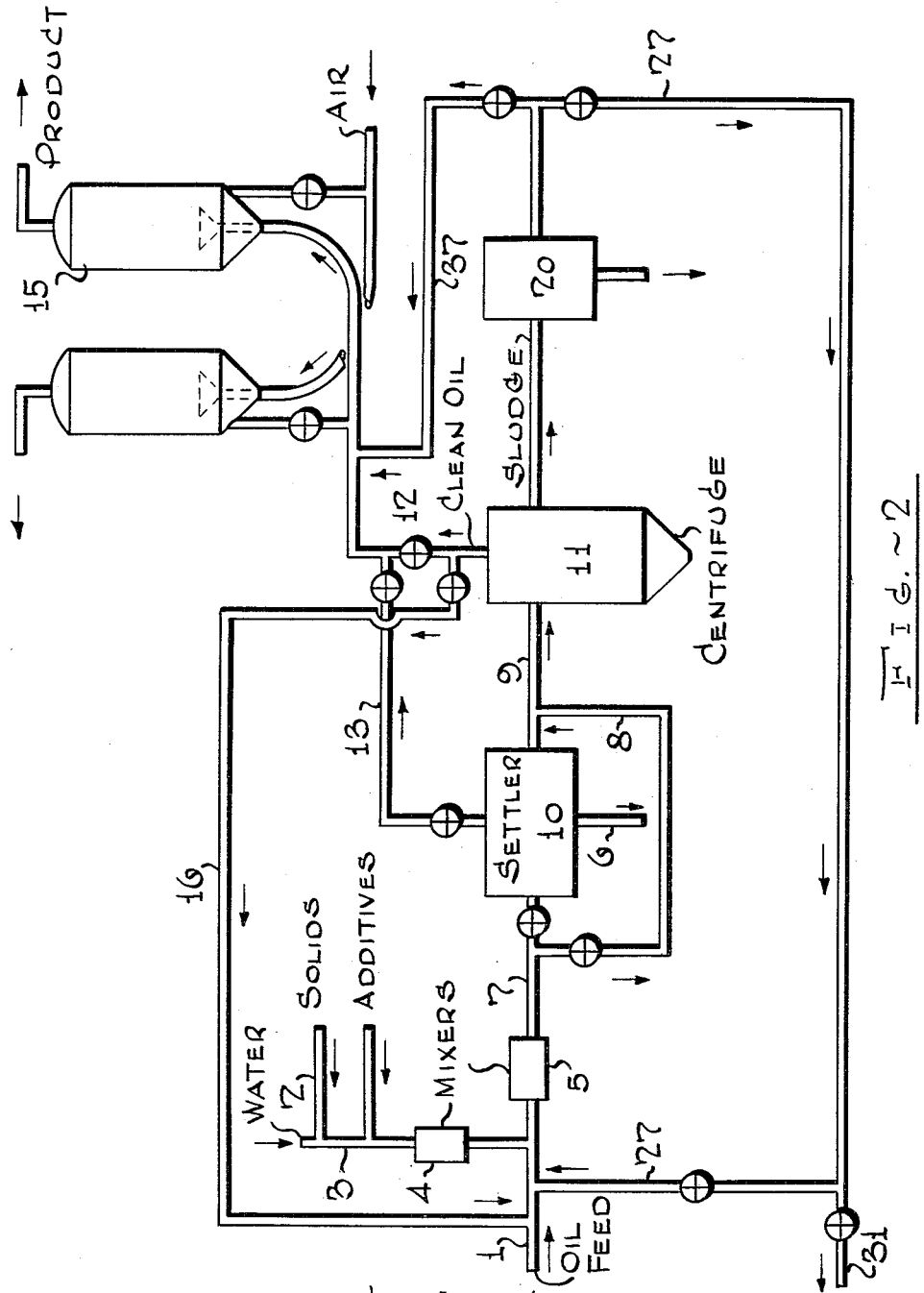

2,761,821

PURIFICATION OF HYDROCARBON OILS

Charles E. Jahnig, Red Bank, N. J., assignor to Esso Research and Engineering Company, a corporation of Delaware Application May 28, 1952, Serial No. 290,523

8 Claims. (Cl. 196—52)

The present invention relates to the purification of hydrocarbon oils. It relates particularly to the removal of metal particles as well as organic and inorganic metal salts from hydrocarbon oils, and especially oils used as feed stocks for catalytic cracking. In its broadest aspect, the invention provides for adding finely divided solids to a hydrocarbon oil for the purpose of speeding up the separation and settling of impurities from the oil. In a preferred form of the invention, the extraneous solids such as cracking catalyst are made up in the form of an aqueous dispersion before mixing with the oil, and purified oil is separated from the mixture by settling, centrifuging or the like.

Hydrocarbon oils, such as crude oil and its distillation and conversion products, contain various types of contaminants which detrimentally affect refining processes, product handling and product quality. For example, crude oil contains various water soluble inorganic salts, particularly sodium chloride. Crude oils and distillate oils also may contain elemental metal or metal oxides or sulfides, particularly in the form of particles which may either originate in the crude or result from erosion or corrosion of metal lines and storage tanks. In some cases, oil soluble metallic compounds may be present due to corrosion of equipment by naphthenic acid or other acidic constituents of the oil. Also, oils frequently contain carbon or certain high-molecular weight hydrocarbonaceous materials, such as certain pitches and asphalts, which are insoluble in water and may be insoluble in oil at atmospheric temperature.

In catalytic processes, such as catalytic cracking, the presence of minute amounts of metal compounds or particles in the feed presents a serious problem, since these contaminants accumulate on the catalyst and degrade it. In a typical commercial cracking unit having a capacity of 40,000 barrels per day, the presence of iron in the oil feed in a concentration of only 1.0 pound $Fe_2O_3$ per 1,000 barrels of oil results in a loss in catalyst selectivity which is reflected in a loss in product values of $500,000.00 per year. However, while this is a very large debit, it amounts to only a few cents per barrel of feed. Hence, the potential credit obtainable by iron removal is insufficient to justify any complicated or expensive process for removing contaminants from the oil feed. Thus, even so simple a process as redistilling the feed would entail an operating cost exceeding the credit for removing the contaminants, and would be uneconomical.

Considerable removal of water-soluble contaminants may be accomplished by conventional water-washing. This involves emulsifying the oil with a minor proportion of water. However, the resulting emulsion is quite stable and must normally be broken by electrical precipitation or similar means to form separate layers of oil and water, to permit removing the contaminants together with the water in which they are dissolved or suspended. Alternatively, some undissolved contaminants may be removed by filtration, and oil soluble metallo-organic compounds may often be decomposed at elevated temperatures to form insoluble precipitates which can then be separated by filtration.

However, water-washing has not been very practical because of the difficulties of dealing with the emulsion formed. Filtration has also been found relatively impractical since large proportions of these contaminants, such as iron, its oxides and sulfides, as well as traces of heavy pitches and asphalts and carbon particles are present in the form of extremely small particles which may range to less than one micron in diameter and may actually approach colloidal dimensions. Extremely fine filters are, therefore, required which involve pressure drops and plugging difficulties so excessive that conventional filtration has never appeared attractive in commercial operation when substantially complete removal of ash constituents was desired. Distillation, while theoretically feasible, is uneconomical commercially.

The deashing process of the present invention avoids the aforementioned difficulties and affords various additional advantages. This will become apparent from the following description in which reference will be made to the accompanying drawing. In the drawing Figure 1 is a flow diagram illustrating an embodiment of the invention wherein the oil is treated with powdered solids in an essentially anhydrous condition while Figure 2 represents another embodiment wherein the treating solids are mixed with water.

The contaminant may be present in oil in various forms, such as fine particles of metallic or carbonaceous material. Particles of water-soluble salts may also be present, particularly if little or no liquid water is present. In addition there may be small drops of water containing appreciable amounts of dissolved salts, etc. If the temperature is raised, this water may be vaporized, precipitating the soluble salts. It has been found that all these contaminants can be removed from oil by mild mixing with a small amount of finely divided solids and then settling. Vigorous agitation should be avoided as it tends to retard subsequent settling. The solids are essentially non-reactive under the conditions employed and are preferably siliceous material such as sand, clay, silica gel, rock dust, etc. Other mineral matter may be used, such as partially dehydrated gypsum (plaster), cement, glass, etc. It is desirable that the solids are very finely powdered, for example, such that most will pass through a 200 mesh screen, or are preferably in the particle size range between about 20 to 200 microns. However, it is generally not necessary to remove the 0 to 20 micron fractions before using, since these particles agglomerate in the oil and settle relatively rapidly, thus contributing to the removal of contaminants. In fact, this fine fraction is sometimes available at low cost and can be used to advantage, since it has high surface area and is more effective per pound. A particularly effective solid has been found in fresh or spent cracking catalyst of the conventional silica-alumina or silica-magnesia gel type, natural or acid-treated clays, etc.

After mild mixing, the solid particles settle out of the oil virtually completely in as little as a fraction of an hour and carry with them the contaminants such as iron particles and so on. The solids may be added to the process in amounts equal to 1 to 20 weight percent on oil feed. With gas oil or similar catalytic cracking feed, 1 to 2 percent is usually satisfactory. It is generally desirable to use a rather high concentration of solids, but these may be reused or recycled, so that the actual consumption is much less than 1 percent on oil. Depending on the viscosity of the oil treated, the process may be operated between room temperature and about 600° F., high temperatures being preferred with the relatively more viscous oils. Soaking, particularly at elevated temperature, has the beneficial effect of coagulating or agglomerating the particles so that they are more readily separated subsequently by settling, filtration, centrifuging, etc.

After addition of the solids the mixture is allowed to settle for a period which may extend from about 1 to 10 hours. Settling may be aided by decreasing the distance through which the particles must move, and horizontal baffles can be used to advantage in this connection. After settling, the solids are separated from the purified oil and may be reused, preferably after cleaning by washing. A particularly effective wash liquid is 10–30 percent isopropyl alcohol in water. For example, when this is used to wash spent sand, the oil is removed readily together with the contaminants and floats to the top where it can be removed. The middle aqueous layer is clean and can be used again. Clean sand collects at the bottom and may be reused as is, or can be washed to remove alcohol, dried, etc. Alternatively, the sand can be washed with benzene, light hydrocarbons, alcohols, acetone, detergent solutions, methyl ethyl ketone, and the like, and then with water. Or, the used solids may be ignited at about 1000–1400° F., or higher.

A particular application of this system is shown in Figure 1 for use in removing contaminants from oil such as catalytic cracking feed. In this system the oil is contacted with a sludge or heavy slurry phase containing the treating solids, and the oil is then decanted and contacted with further amounts of solids. The solids are used in the form of a segregated slurry phase, which passes countercurrently to the oil feed. It is then removed and cleaned by washing, etc. to make it suitable for reuse.

Referring now to the drawing, contaminated oil feed is introduced to the bottom of contacting vessel 1 through line 2 and flows up through a perforated plate 3 or an equivalent bubble cap plate or the like. Above this plate is a slurry phase through which the oil feed percolates upwardly as the slurry flows laterally across the plate. By proper choice of the conditions, the oil leaving the top of the sludge layer is substantially free of treating solids, that is, the upward oil velocity is such that practically no solids are entrained from the slurry. With typical cracking feed, a velocity of about 5–50 ft. per hour is satisfactory when using treating solids finer than 200 mesh, with a weight average particle size of less than 200 microns, preferably 20–100 microns.

The contacting of the oil with the slurry of treating solids removes contaminant particles, drops of water, salt crystals, asphalt, etc. from the oil feed. A settling or disengaging zone 6 is provided above slurry layer 4, and this is substantially free of treating solids. Separate vessels may be used for each zone if desired. The oil then flows up through subsequent treating plates such as 5 to further clean the oil.

The slurry of treating solids is introduced at 22, or, if the solids are added as a dry powder, they form a slurry with the oil in the vessel. The slurry persists as a separate phase as it flows across the successive plate and conventional downcomer or overflow pipe down through the tower, countercurrent to the rising oil. Clean oil leaves the top of the tower at 7 and is sent to catalytic cracking, etc. A filter 11 may be located near the outlet 7, to remove solids which might be harmful to subsequent equipment such as pumps, exchangers, etc.

Accumulation of contaminants on the treating solids reduces their ability to pick up additional amounts of contaminant. Hence they are cleaned upon removal and then returned to the tower. Spent slurry is withdrawn at 8 and may be stripped, settled, filtered, etc. It is then mixed with a cleaning solution such as water-alcohol, etc. and passed through mixing valve 12. The alcohol acts as a wetting agent to permit the water to wet the solid particles, thereby releasing the oil and contaminant. Other common surface active agents or detergents may be used. The resulting suspension passes to a settler 13 where the solids fall to the bottom. The oil and contaminants float to the top and are withdrawn at 15 and processed for oil recovery if desired, or otherwise disposed of. The alcohol-water phase collects as a middle layer and can be saved for reuse. Clean solids are withdrawn at 18. Part of these may be rejected via line 19, and part recycled through line 20 to the treating tower 1. Makeup solids are added at 22. The cleaning system is pictured as operating intermittently, that is, solids are withdrawn and slurried with wash liquid and then allowed to settle in tank 13 for 1–10 hours. If desired, the cleaning can be continuous, in which case it is preferable to use at least two settling tanks in series with the solids removed from the bottom of the first tank, and wash liquid taken from the bottom of the second tank. The remaining oil-contaminant layer can be settled in a separate tank to remove contaminants, or it can be filtered, distilled, etc.

One particularly surprising feature of this system is that the fine solids do not disperse in the hydrocarbon, but form a concentrated slurry phase which flows through the treating tower separate from the main oil stream. The concentration in this slurry depends upon the upward oil velocity, and decreases as the oil velocity increases. By using the proper velocity a reasonable slurry density can be maintained while at the same time the oil flows up through the slurry and can be withdrawn from the top substantially free of treating solids. A few feet of clear oil layer is provided above the slurry phase to assure low entrainment. An upward oil velocity of 1–100 feet per hour is normally satisfactory. The exact value is best determined by simple settling experiments to establish slurry settling versus concentration. For example, with a 500–1000° F. boiling point gas oil operating at 200° F. (about 5 centipoises viscosity), the oil velocity may be in the range of 5–50 feet per hour. For less viscous hydrocarbons the permissible velocity will be higher.

In another and even more effective embodiment of this invention the extraneous solids are used with the oil together with a small amount of water. It has been known heretofore that suspended solids and water soluble contaminants can be removed from oil fairly easily by thoroughly mixing the oil with water and then settling out the emulsion. It appears that in such a process the contaminants concentrate at the interface between the oil and water surfaces. Unfortunately a large amount of very stable emulsion is thus formed which requires expensive equipment for breaking. According to the present invention, it has been found with many oils that if a few percent of a fine cracking catalyst or similar solid is mixed with the water before the latter is mixed with the oil, the resulting emulsion, if formed at all, is relatively unstable and separates quickly and more or less completely on settling. Clear oil and a water layer are formed with little or no residual emulsion. The solids may be used in an amount about 0.1 to 10 weight percent of water, or preferably about 0.5 to 2 weight percent when conventional cracking catalyst is used.

In many cases separation of water and oil can be further improved by the use of chemical additives. For instance, a small amount of sulfuric, acetic, boric or similar acid sufficient to adjust the water to a pH of about 4 to 6, or a demulsifier, or both, frequently improve the separation. The amount of water used depends somewhat on the particular oil feed and may range from about 1 to 10 weight percent on the oil treated. When desired, this water may be recycled in the process, after separation of the solids if desired.

For best results the solids must be added to the water before they are mixed with the oil, since they are not so effective in reducing emulsion if they are first wetted by the oil. After settling, the contaminants are concentrated in a zone just above the water layer, and are carefully drawn off to leave clean oil. The contaminant concentrate may be processed to recover oil, etc. by distillation, filtration, centrifuging, etc.

It is frequently desirable to operate the process so as to leave a small amount of emulsion to insure particularly complete removal of the iron or other contaminant particles. This may be done by controlling the amount and character of the solids used, the amount of water, or the settling time, degree of mixing, etc. The solids may be added as needed to speed up the separation process and leave the contaminants concentrated in a small volume of emulsion. The process is normally operated at temperatures high enough to activate the adsorptive or flocculating qualities of the catalyst but not high enough to cause appreciable cracking of the feed stock. Thus suitable temperatures may range from about 150 to 400° F. at pressures at least sufficient to maintain a liquid water phase. When desired the mixture may be allowed to settle for about 2 to 10 or more hours before clean oil is separated.

In general, the formed emulsion layer will retain about 1 to 10 per cent of the oil feed. This emulsion may be processed for oil recovery, by filtration, distillation, electrical precipitation or the like, the cost being tolerable inasmuch as the total volume of the liquid so to be processed is relatively small.

Instead of relying on a gravity settler to effect the desired separation, a centrifuge may be used. Such a centrifuge may be 10 to 40 inches in diameter, operated at about 1000 to 5000 R. P. M. and provide a holding time of about 0.1 to 5 minutes. A cyclone type separator may also be used on the liquid stream to effect the separation. In some cases it may be particularly advantageous to use a precontactor to coalesce or agglomerate the drops or particles before the mixture is passed to the centrifuge. This may employ heat soaking, high frequency vibrations, etc., and some contaminant may be settled out in the precontactor and removed.

A better understanding of this embodiment may be gained from Figure 2. The illustrated system essentially comprises a globe valve 5, or an equivalent mixing device such as an orifice mixer or vibrating plates; a separation device such as settler 10 and/or centrifuge 11, and a hydrocarbon conversion plant such as catalytic cracking unit 15. The functions and coaction of these elements will be explained using as an example the removal of water insoluble and oil insoluble iron contaminants from a catalytic cracking feed stock of the gas oil type. However, it will be understood, of course, that the illustrated system and modifications based thereon may be used for the removal of various contaminants from the same or different oils in a substantially analogous manner. For instance, the invention may be readily adapted for deashing naphthas, heating oils, lube and turbine oils, crudes and so forth.

In operation the gas oil having a boiling range suitable for catalytic cracking, for instance, about 500 to 1000° F., is supplied to line 1 from storage or directly from a crude still. The oil feed contains insoluble iron-containing contaminants of very fine particle size amounting to about 0.2 to 2.0 pounds $Fe_2O_3$ per 1000 barrels of oil, plus sodium and other salts amounting to 1–10 pounds. A stream of water amounting to about 1 to 10 or 15 volume percent on oil feed is added to line 1 via line 3 at a point upstream of mixing valve 5. The temperature of oil feed and water is such that the mixture leaves valve 5 at a temperature of about 150 to 300° F. The water in line 3 is mixed with about 0.5 to 5 weight percent of fresh or used silica-alumina cracking catalyst or clay having a particle size predominantly between about 20 and 300 microns. These solids may be from subsequent unit 15 and may be added to the water via line 2. Enough acid such as sulfuric acid may also be desirably added to the water to adjust its pH to a value between about 4 and 6. Demulsifiers such as commercially available petroleum sulfonates, etc., may also be added to the oil stream in line 1 or to water line 3. An even distribution of the added materials in the water may be obtained by passing the water stream through mixing valve 4.

The mixture of oil and water in line 1 is passed through a mixing valve such as globe valve 5 which is preferably of the type used for controlling pressure and may have a valve seat arrangement which forces the liquids through a tortuous path conductive to intimate mixing, at a pressure drop across the valve usually ranging from about 10 to 50 pounds per square inch. Sufficient mixing may thus be obtained to effect the desired initial emulsification. The liquid leaving mixing valve 5 through line 7 will consist of a substantially homogeneous water-oil emulsion which, however, is fairly unstable because of the added solids. This stream may be passed to precontactor or settler 10 at a pressure between about 0 and 100 pounds per square inch gauge. Settler 10 may be a conventional gravity settling tank of sufficient volume to allow for a quiescent liquid residence time of about 1 to 10 or more hours at the prevailing oil feed rate. The separation in settler 10 results in the formation of an upper oil layer which is substantially free of water and insoluble iron-type contaminants, and a bottom layer which consists of most of the water added through line 3, and also contains most of the water soluble salts. This water layer may be withdrawn through line 6 along with solids and associated contaminants which have settled out of the oil. A third, intermediate phase may also be formed which contains much of the insoluble contaminant, and may consist of a fairly stable water and oil emulsion containing about 1 to 5 or 10 percent of the oil feed, and as much as 50–99 percent of the insoluble contaminants originally present in the oil. In such an operation the clean oil layer may be decanted from settler 10 and passed to cracking unit 15 via line 13. The intermediate, contaminated layer may be withdrawn from settler 10 via line 9 and passed to a centrifuge to separate additional clean oil which may be passed to cracking unit 15 via line 12. On the other hand, if this oil still contains contaminants, it can be recycled via line 16 and reprocessed, or it can be distilled, filtered, or otherwise decontaminated. As an alternative, centrifuge 11 may be replaced altogether and clean oil may be recovered from the emulsion stream 9 by distillation, filtration, coking or thermal cracking.

Instead of using tank 10 as a settler, it may often be preferred to use it merely as a precontactor wherein the drops or particles will agglomerate without obtaining final separation of the phases. In such a case substantially all the liquid introduced through line 7 may be removed through line 9 and it may be actually desirable to mildly agitate the contents of tank 10 to speed up the agglomeration. However, vigorous, turbulent mixing is generally undesirable since it tends to increase the stability of the resulting emulsion without noticeably improving the completeness of contaminant removal. The mixture in line 9 is then introduced into centrifuge 11 where the main separation takes place and clean oil is passed via line 12 to cracking unit 15.

The oily sludge which contains the concentrated contaminants and usually also some water can be processed in unit 20 for recovery of oil and/or solids by additional settling, filtration, distillation, electrical precipitation or the like, or any combination thereof. All or a portion of the separated oil may then be recycled via line 27 to be mixed with additional solids and water from line 3 and retreated as described earlier. Any oil not so recycled may be passed via line 31 to the original crude still or to a separate cracking or coking stage or the like. Also, especially if recovery unit 20 is a distillation column, the recovered oil may be sufficiently clean for passing directly to cracking unit 15 via lines 37 and 12.

In another modification of the invention it is possible to bypass tank 10 altogether and to pass the oil and water emulsion from mixing valve 5 directly to centrifuge 11 via lines 7, 8 and 9.

Instead of effecting the separation by forming an emulsion, which must be broken afterwards, good results may similarly be obtained by floating a thin layer of oil over a moving or stationary water surface which may contain added finely divided solids, so that the contaminants collect at the oil-water interface. For instance, the necessary interface may be obtained simply on the surface of a large pool or expanse of water. Alternatively, a suitable interface may be obtained in a fixed bed of packing, wet with water. The packing may consist of material such as relatively coarse cracking catalysts or similar materials which are preferentially wetted by water and attract the contaminant particles. The size of the particles forming the packing may range from about 5 to 150 mesh in diameter. A small amount of water may be added during operation, preferably in countercurrent fashion with respect to the oil feed which is usually passed through the bed in an upward direction. The added water serves to keep the packing wet. When a greater amount of water is used during the oil treating step, this may serve to wash contaminants continuously off the packing. A settling tank may be used following the packed tower to remove water drops and agglomerates of contaminants. Otherwise, the packing is preferably cleaned by periodic scrubbing with water, solvents or the like, or it may be periodically replaced with fresh material. The packing, instead of being granular, may consist of flat horizontal stacked sheets or plates of a suitable material such as paper, cloth or the like coated with a slurry of clay or other solids to enhance the separation. To further increase the rate of contaminant removal according to the present invention, a small amount of solids such as cracking catalyst may also be added directly to the uncleaned oil before it is introduced into the packed tower.

Regarding the catalytic cracking stage, the invention affords greatest advantages in combination with continuous catalytic cracking units, especially those of the "Fluid" type, wherein any contaminants present in the feed tend to be distributed almost immediately over the entire catalyst inventory. However, the invention may likewise be applied to other systems such as fixed bed or suspensoid catalytic cracking.

While the invention has been described with particular reference to the decontamination of catalytic cracking feed stocks such as gas oils, there is a variety of other highly useful applications of the invention. It can be used, quite generally, for separating or recovering particles or compounds which are insoluble in oil or water or both.

Other modifications will occur to those skilled in the art without departing from the scope of the present invention as defined in the appended claims.

I claim:

1. In combination with a fluid catalytic cracking process, the improved procedure for removing ash-forming constituents from a gas oil feed having a boiling range between about 500 and 1000° F. which comprises mixing water at a pH of about 4 to 6 with about 0.5 to 2 weight percent of a finely divided, used silica-alumina cracking catalyst, adding the resulting water slurry to the hydrocarbon feed in an amount of about 1 to 10 weight percent of the slurry based on the oil treated, mixing the oil and the aqueous slurry, maintaining the mixed water and oil phase in contact with each other to effect substantial agglomeration of emulsified particles, centrifuging the resulting mixture at a temperature between about 150 to 400° F. at a pressure at least sufficient to maintain a liquid water phase, and separating a clean hydrocarbon layer oil from a water layer containing dissolved solids and an aqueous emulsion containing about 1 to 10 weight percent of the total hydrocarbon feed together with solid particles.

2. A process according to claim 1 wherein the separated aqueous emulsion layer is broken in a distillation zone, and the resulting clean hydrocarbon distillate is passed to a catalytic cracking stage.

3. A process for removing ash-forming constituents from a contaminated hydrocarbon oil boiling in the range of about 500 to 1000° F. which comprises passing the contaminated oil in sequence upwardly through a plurality of treating zones at a velocity of about 5 to 50 feet per hour, simultaneously introducing finely divided solids into the last of the aforesaid treating zones whereby the solids and treated oil form a substantially anhydrous dense liquid slurry phase containing about 1 to 20 weight percent of solids on oil in the bottom portion of the treating zone with a substantially clear oil phase thereabove, passing the slurry as a separate phase laterally across the rising stream of oil in each of the aforesaid treating zones in countercurrent sequence with respect to the oil treated, removing purified oil from the top of the last treating zone, and withdrawing spent slurry from a bottom portion of the first treating zone.

4. A process according to claim 3 wherein the withdrawn spent slurry is mixed with a wash liquid containing about 10 to 30 weight percent of isopropyl alcohol in water, the mixture is passed to a settling zone, and washed solids are collected at the bottom and are recycled to the treating zones to form the required dense slurry.

5. A process for removing ash-forming constituents from a gas oil to improve it as a feedstock for catalytic cracking which comprises mixing water with about 0.5 to 2 weight per cent of a finely divided siliceous solid at a temperature between about 150° and 400° F. and at a pressure sufficient to maintain a liquid water phase to form an aqueous slurry, adding the slurry to the gas oil in a ratio of about 1 to 10 parts by weight of the slurry per 100 parts by weight of the oil to be treated, mildly mixing the oil with the aqueous slurry, settling the mixture to separate it into layers including a clean oil layer and an aqueous emulsion layer, and recovering the clean oil layer.

6. A process according to claim 5 wherein said emulsion layer contains about 1–10% of the oil feed and is recovered and the recovered emulsion is broken to recover the oil therein.

7. A process according to claim 5 wherein the mixture is settled for about 1–10 hours before recovering the clean oil layer.

8. A process for removing ash-forming constituents from a metal-containing hydrocarbon oil which comprises wetting a packed bed of siliceous cracking catalyst particles ranging in diameter from about 5 to 150 mesh with water and passing the metal-containing oil through the water bed, said oil being percolated upwardly through said bed while a small amount of water is simultaneously passed through the same bed countercurrently to the oil.

References Cited in the file of this patent

UNITED STATES PATENTS

| | | |
|---|---|---|
| 1,866,590 | Baylis | July 12, 1932 |
| 2,236,679 | Ferguson et al. | Apr. 1, 1941 |
| 2,273,147 | Schumacher et al. | Feb. 17, 1942 |
| 2,340,939 | Davis et al. | Feb. 8, 1944 |
| 2,384,315 | Kuhl | Sept. 4, 1945 |
| 2,395,491 | Mavity | Feb. 26, 1946 |
| 2,495,723 | Hormann | Jan. 31, 1950 |
| 2,507,523 | Houdry | May 16, 1950 |
| 2,614,068 | Healy et al. | Oct. 14, 1952 |
| 2,689,825 | McKinley | Sept. 21, 1954 |

OTHER REFERENCES

Kalichevsky: "Chemical Refining of Petroleum," 2nd edition (1942), pp. 34–35, Reinhold, publisher, New York.

Kalichevsky et al.: "Petroleum Refiner," vol. 32 (June 1953), page 98.